Figure 8:
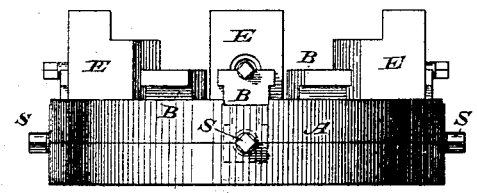

(No Model.)  2 Sheets—Sheet 1.
C. A. SINGER.
LATHE CHUCK.
No. 346,133. Patented July 27, 1886.
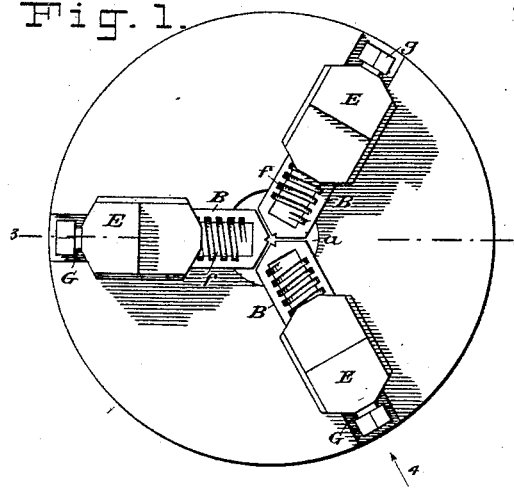
Fig. 1.
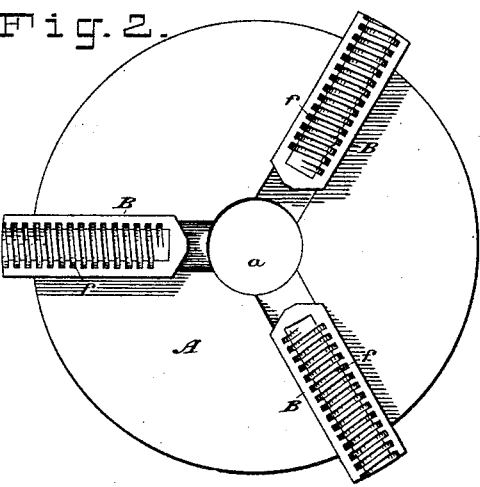
Fig. 2.
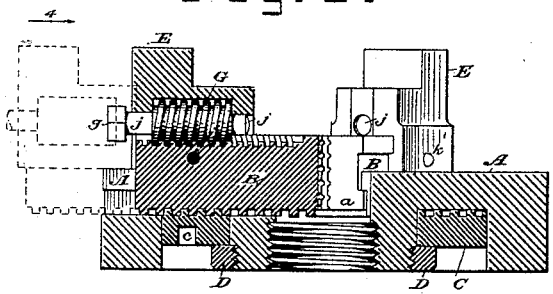
Fig. 3.
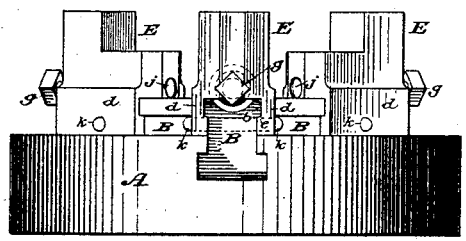
Fig. 4.
Fig. 5.
Fig. 6.
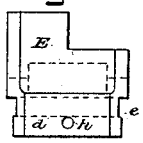
Fig. 7.
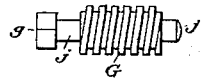
WITNESSES:
E. B. Bolton
Geo. H. Fraser.
INVENTOR:
Charles A. Singer
By his Attorneys.
Burke, Fraser & Bennett (No Model.)   C. A. SINGER.   2 Sheets—Sheet 2.
LATHE CHUCK.

No. 346,133.   Patented July 27, 1886.

WITNESSES:
E. B. Bolton
Geo. H. Fraser.

INVENTOR:
Charles A. Singer
By his Attorneys,
Burke Fraser & Bennett

UNITED STATES PATENT OFFICE.

CHARLES A. SINGER, OF NEW YORK, N. Y.

LATHE-CHUCK.

SPECIFICATION forming part of Letters Patent No. 346,133, dated July 27, 1886.

Application filed November 25, 1885. Serial No. 183,989. (No model.)

*To all whom it may concern:*

Be it known that I, CHARLES A. SINGER, a citizen of the United States, residing in the city, county, and State of New York, have invented certain Improvements in Lathe-Chucks, of which the following is a specification.

This invention relates to chucks of that class wherein the jaws or dogs for gripping the work are both "universal"—that is, moving out and in concentrically together and "independent"—each being adjustable independently of the others.

Combined universal and independent chucks, as heretofore made, have been of two kinds, namely:

First. In chucks of the first kind the jaws are capable of being disconnected from the motive gear by which their universal movement is effected, whereupon each jaw may be propelled outward or inward by its own screw. When it is desired to render the chuck universal again, all the jaws must be set to positions equally distant from the center, whereupon they are reconnected to the motive gear. The motive gear in this kind of chuck is most commonly an annular rack engaging pinions on the radial screws which propel the jaws. The well-known "Sweetland" chuck is an example of this class.

Second. In chucks of the second kind the jaws are connected to the motive gear through the medium of sliding pieces or boxes deeply embedded in the body of the chuck, these boxes being always in connection with the motive gear, and the jaws being adjustable relatively to the boxes by means of screws, which are journaled in the boxes and engage threads on the jaws. The motive gear is usually a scroll-ring, the spiral teeth on its face engaging teeth on the back of the boxes, so that as this ring is turned the boxes move out or in radially together, carrying the jaws with them. Each jaw may then be adjusted relatively to its box by its individual screw. The well-known "Westcott" chuck is typical of this class.

All combined universal and independent chucks heretofore made, of whichever class, are subject to the disadvantage that when the jaws have been rendered independent their equidistance from the axis of the lathe is lost, and can only be recovered by careful adjustment by the workman, the accuracy of the centering of the chuck as a universal chuck depending then solely on the care and skill with which it has been recentered. The trouble and loss of time occasioned by the necessity for this readjustment and the liability to inaccuracy in the hands of an unskillful mechanic have greatly limited the use of combined chucks.

Independent chucks are very rarely required for small work, small objects—such as pivots, drill-shanks, &c.—being almost invariably held concentrically. In turning eccentric or irregular work with a combined chuck, as heretofore made, the concentricity of the jaws for small objects is lost, and if it be necessary to grasp a drill or reamer and then to again hold the eccentric work the mechanic must laboriously adjust his chuck as a universal chuck, and afterward readjust the jaws independently to the irregularity or eccentricity of the work in hand.

My invention seeks to provide a combined independent and universal chuck which shall be free from these disadvantages.

My invention may be applied to either scroll or geared chucks, although I prefer to use a scroll as the motive gear.

Figure 9:
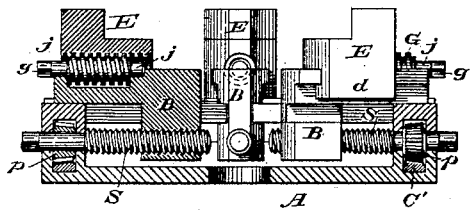

Figs. 1 to 7 of the accompanying drawings show my invention in its preferred construction as applied to a three-jaw scroll-chuck. Figs. 1 and 2 are face views of the chuck. Fig. 3 is a diametrical section thereof, cut in the plane of the line 3 3 in Fig. 1. Fig. 4 is a side elevation looking in the direction of arrow 4 in Figs. 1 and 3; and Figs. 5, 6, and 7 are side elevations, respectively, of an independent jaw, its adjusting-screw, and a universal jaw separated. Fig. 8 is a side elevation of a four-jaw geared chuck embodying my invention, and Fig. 9 is a diametrical section thereof.

I will first describe the construction shown in Figs. 1 to 7.

A is the face-plate or body of the chuck. B B are the universal jaws, and C is the motive gear for imparting their universal movement to these jaws. The face-plate A is preferably cast in one solid piece, has a central hole, $a$, for screwing on the lathe-spindle, and has radial ways or grooves for the jaws B B to slide in, all as is usual. The motive gear C is in this construction a scroll-ring let into the back of the face-plate, and held there in place by a screw-collar, D, as usual. The scroll-ring C is provided with recesses *c c* in its rear face, to receive the wrench by which it is turned. Its front face has spiral scroll-teeth engaging similar teeth on the backs of the three jaws B B. The jaws B B may enter the central hole, *a*, as shown in Figs. 1 and 3, being pointed, so as to enable them to grip the smallest shank or rod that it is desired to grasp. When moved outwardly, as shown in Fig. 2, they will grasp any larger object, holding it concentrically.

So far as already described this chuck is substantially the same as the old and common universal scroll-chuck. The jaws B B are not independent.

E E E are three independent jaws or dogs, which engage the jaws B B B, and are adjustable relatively thereto. The jaws E slide over and embrace the jaws B, and rest against the face-plate, being made with lateral flanges *d d*, which come down on opposite sides of the jaws B. Each jaw B has overhanging shoulders *b b* on its opposite sides above the surface of the face-plate, and each jaw E has internal shoulders, *e e*, formed on its flanges *d d*, which shoulders take under the overhanging shoulders *b b*, thus confining the jaw E to the jaw B, as best shown in Fig. 4. Any construction of abutting shoulders by which the jaw E will be confined down to the jaw B will be the equivalent of the one here shown.

Each jaw E is hollowed out beneath to form a recess for a screw, G, the reduced journals *j j* of which enter open notches in the jaw, and the head *g* of which projects beyond the outer end of the jaw, where it may be engaged by a wrench or key. The female threads for the screws G G to engage are formed in the upper faces of the jaws B B, as shown at *f f*. These female threads are of sufficient depth to engage the threads of the screw G for about one hundred and twenty degrees in the construction shown, although this proportion may be varied, say, from ninety to one hundred and eighty degrees. By turning the screws G G the independent jaws E E may be moved to any desired positions on the universal jaws B B, so that they may grasp any irregular or eccentric work, whether large or small. At the same time the concentricity of the jaws B B is not disturbed, and the irregular work may at will be removed from the chuck (by a turn of the scroll-ring C) and the jaws B B be used to hold a drill or other device. Further, the irregular work may be quickly replaced in its former position without readjustment, if only the screws G G have not been turned, its replacement being facilitated if its position relatively to the jaws E E has been marked before its removal. Thus my chuck combines, for the first time, as I believe, the distinguishing advantages of both the universal and independent chucks without losing the efficiency or convenience of either.

The jaws E are preferably made in steps, as shown, the inner end of each jaw B constituting, when set for universal use, the lower or first step of the combined jaw, and the steps in the jaw E constituting the second and third steps. When the chuck is to be used as a universal chuck, each of the jaws E should be adjusted to such position on the jaw B that holes *h* through its flanges *d d*, Fig. 5, will exactly coincide with a hole, *i*, through the jaw B, Fig. 7, whereupon a pin or key, *k*, may be passed through both holes, as shown in Fig. 4, thus locking the two jaws together as one. Thus the accurate placing of the jaws E E is insured. Additional holes, *h* or *i*, may be made in other positions, if desired. Where the two jaws are to be thus locked together, the screws G G may be separated, if desired, and laid away temporarily until such time as it is necessary to use the chuck as an independent chuck.

The jaws E may at any time be detached from the jaws B B, as shown in Fig. 2, leaving the chuck as a universal drill-chuck. The jaws E E when being replaced may be put on either end first, so as to answer as either outside or inside jaws. When thus reversed, they may be held together by a pin or key, *k*, as already described.

I will now describe the modified construction shown in Figs. 8 and 9. The motive gear C here involves an annular toothed rack, C', a series of pinions, *p p*, gearing therewith, and a series of radial screws, S S, engaging the jaws B B and acting to propel them in a radial direction. The jaws B B are L-shaped, one leg extending radially over the face of the chuck, where it rests in a hollow groove, and the other leg projecting rearwardly into the face-plate, where it serves as a nut for the screw S. The turning of any one of the screws S acts, through the rack C', to turn all the other screws S S. The face-plate A is made in two parts. As thus far described, the construction is the same as that of the common geared universal chucks. No means is provided for disengaging either screw S from the rack C'. The jaws E E slide over and embrace the jaws B B, and are guided thereby, substantially as already described. The individual screws G G, however, are transposed in position, having bearings in the jaws B B, and engaging partial female threads *f f* in the under sides of the jaws E E. The operation of this chuck is substantially the same as that of the form first described.

It is preferable, but not essential, that the jaws E E bear directly against the face-plate, as thereby they are rigidly re-enforced, and the jaws B B are relieved of needless strain; but it is at the same time desirable that the jaws E E should have a true backward bearing against the jaws B B, in order that for grasping very large work, when the jaws are run out beyond the face-plate, as shown in dotted lines in Fig. 3, the jaws E E may be re-enforced against the jaws B B, the latter being long enough and strong enough to bear any ordinary strain thus applied.

I claim as my invention—

1. A lathe-chuck consisting of the face-plate, universal jaws, and motive gear for imparting universal movement to said jaws, in combination with independent jaws engaging said universal jaws and normally moving with the latter, and individual adjusting-screws reciprocally engaging said universal and independent jaws for adjusting the latter upon the former, substantially and to the effect set forth.

2. A lathe-chuck consisting of the combination of the face-plate, universal jaws projecting above the face-plate, a motive gear for imparting universal movement to said jaws, independent jaws sliding upon the universal jaws, reciprocal shoulders on said universal and independent jaws, whereby the latter are confined to the former, and individual screws, each mounted in one jaw and engaging female threads in the other, whereby the independent jaws are adjusted relatively to the universal jaws, substantially as set forth.

3. A lathe-chuck consisting of the combination of the face-plate, universal jaws projecting above the face-plate, a motive gear for imparting universal movement to said jaws, independent jaws sliding upon the universal jaws and adjustable relatively thereto, and coincident locking provisions on said universal and independent jaws, respectively, whereby the latter may be locked to the former in invariable relative position, substantially as set forth.

4. In a chuck, the combination of face-plate A, universal jaws B, projecting above the face-plate and formed with shoulders $b$, and independent jaws E, having flanges $d\ d$ embracing the respective jaws B and bearing upon the face-plate, and shoulders $e$, engaging said shoulders $b$, substantially as set forth.

In witness whereof I have hereunto signed my name in the presence of two subscribing witnesses.

CHARLES A. SINGER.

Witnesses:
ARTHUR C. FRASER,
ELBERT B. BOLTON.